July 30, 1940.  E. MARSOM ET AL  2,209,575
FOOT OPERATED SIGNAL SWITCH
Filed Nov. 17, 1937
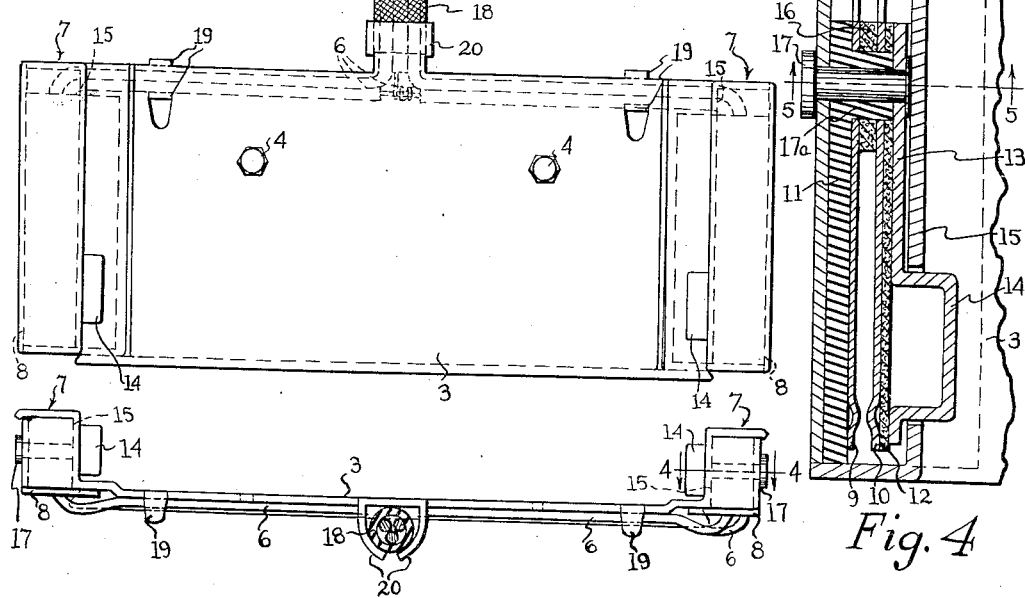
Fig. 1
Fig. 4
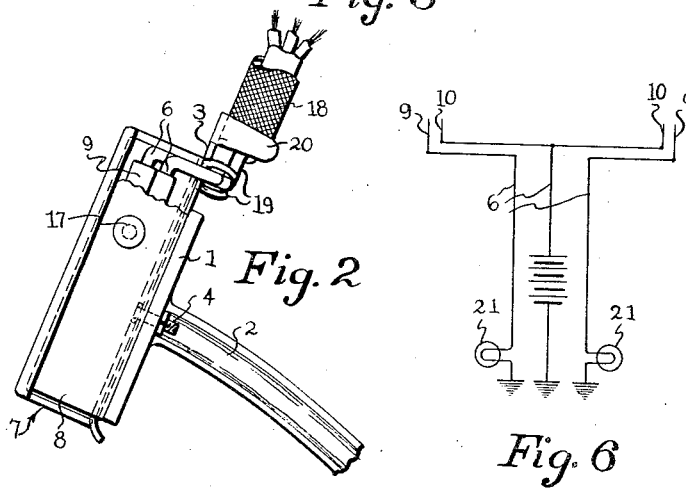
Fig. 3
Fig. 2
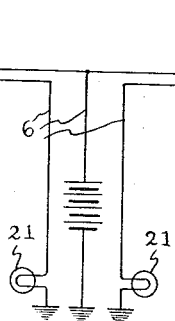
Fig. 6
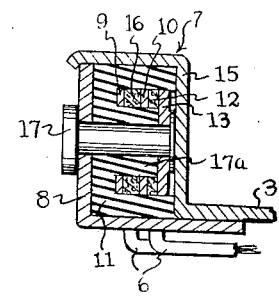
Fig. 5
Inventor
Ernest Marsom
John A. Wells
J. L. Murray
Attorney Patented July 30, 1940

2,209,575

UNITED STATES PATENT OFFICE 2,209,575

FOOT OPERATED SIGNAL SWITCH

Ernest Marsom, Royal Oak, and John A. Wells, Flint, Mich., assignors, by direct and mesne assignments, of one-half to William Wild, Clare, Mich., and one-half to Henry Reetz, Flint, Mich.

Application November 17, 1937, Serial No. 175,002

5 Claims. (Cl. 200—59)

This invention relates to foot-operable switches for motor vehicles, and particularly control switches for signals indicating right and left turns.

An object of the invention is to adapt a switch to be mounted on the brake or clutch pedal of a motor vehicle, for operation by a lateral movement of a foot engaging such pedal.

Another object is to mount a pair of such switches, one for indicating a right and the other a left turn, on a plate attachable to a foot pedal.

A further object is to adapt the paired switches for assembly as separate units, and to adapt such units to be readily secured to the end portions of said plate.

These and various other objects, the invention attains by the construction hereinafter described and illustrated in the accompanying drawing, wherein:

Fig. 1 is a top plan view of the invention attached to a food pedal of a motor vehicle.

Fig. 2 is a side view of the same.

Fig. 3 is a back view of the device, unattached.

Fig. 4 is an enlarged, detail sectional view of one of the switch assemblies, taken on the line 4—4 of Fig. 3.

Fig. 5 is a sectional view of the same taken on the line 5—5 of Fig. 4.

Fig. 6 is a diagram of the electrical connections.

In these views, the reference character 1 designates the brake or clutch pedal of a motor vehicle, 2 a shank surmounted by such pedal, and 3 a plate attached to the pedal by bolts 4 or the like. Wires 6 lead to a pair of switch boxes 7 formed partly integrally with the ends of the plate 3 and partly by angle members 8, and are attached within each switchbox to a pair of spaced switch arms 9 and 10, formed preferably of spring copper, and insulated from the box by channel-shaped member 11, preferably of Bakelite. The angle members 8 are rigidly secured to the plate 3 in any suitable manner, as for example by welding. The arms 10 are preferably actuable by and insulated from flat springs 13 by thin strips of wood fibre 12 or other insulating material, and said springs are formed with buttons 14 which project toward each other through openings in a pair of walls 15, upstanding from the ends of the plate 3. A spacer 16 preferably of wood fibre, maintains the proper distance between the switch arms 9 and 10 of each pair. Parts within each box are held together upon the corresponding angle member 8 by a rivet 17 whereby each switch may be completely assembled before being attached to the plate. Preferably a boss 17a is formed upon and within each member 11 to accommodate the corresponding rivet. Wires 6 leading from the switches to a conduit 18 are held in proper position by tongues 19, and a pair of similar tongues 20 embrace the conduit. The switch boxes are mounted at opposite ends of the plate and project thereabove forming a space above the plate to accommodate the driver's foot.

In operation, a slight lateral pressure of the driver's foot against one or the other of the buttons 14 serves to close the corresponding switch and signal a right or left turn, thus eliminating necessity for hand signals. The latter are unreliable and frequently misunderstood, especially at night or during bad weather, and annoyance of opening a vehicle window in cold or wet weather is also avoided. With proper electric signals, as indicated at 21, a right or left turn may be definitely and easily signaled by a driver, excluding any chance that other motorists will fail to see or understand such signal.

While it is preferred to attach the described switch to a control pedal, as has been described, it is, of course, possible and may be desirable in some installations to mount it on a vehicle floor board (not shown), the construction remaining substantially the same.

Provision on the plate 3 of keepers for the wires 6 leading to the switches is essential, since otherwise movement of the foot pedal, in use, would soon dislodge the wires from their proper positions.

It will be noted that the channel-shaped, insulating member 11 of each switch forms a retainer for the parts 9, 10, 12, and 13, facilitating assembly of the latter in proper relation. Also the member 11 prevents any relative rotation of said parts about the rivet 17, and thus avoids necessity for any connection between said parts other than such rivet.

The invention is presented as including all such modifications and changes as come within the scope of the following claims.

What we claim is:

1. A switch comprising a metal box having an aperture in a wall thereof, a channel-shaped insulating member fitted in such box, a pair of elongated normally spaced switch members disposed in the channel of the insulating member, an element extending through and interconnecting corresponding end portions of the arms, a spacer mounted on such element, holding the arms normally apart and insulating them one from the other, and a push button mounted in said aperture and adapted, under pressure, to electrically interengage the other end portions of said arms.

2. A switch as set forth in claim 1, said arms being so confined by said insulating member, as to maintain them in a substantially definite opposed relation.

3. A switch as set forth in claim 1, said insulating member being integrally formed with a boss, through which the interconnecting element extends and by which said arms are insulated from said element.

4. In a switch, the combination with a supporting plate having a marginal portion bent to form a lateral wall and the top of a switch box, said wall having an aperture, of a member secured to said plate and bent to form the bottom of said box and a wall opposed to said apertured wall, and a normally open switch housed in said box and comprising a push button mounted in said aperture for closing the switch.

5. A switch comprising a channel-shaped insulating member, a pair of elongated normally spaced switch members disposed in the channel of the insulating member and so conforming to such channel as to be maintained by the channel walls in a definitely opposed relation, means securing said arms at corresponding ends thereof within the channel and maintaining them normally spaced apart, and means for electrically interengaging the arms adjacent to their other ends.

ERNEST MARSOM.
JOHN A. WELLS.